(12) United States Patent
Williams et al.

(10) Patent No.: US 6,934,823 B2
(45) Date of Patent: Aug. 23, 2005

(54) METHOD AND APPARATUS FOR HANDLING MEMORY READ RETURN DATA FROM DIFFERENT TIME DOMAINS

(75) Inventors: Michael W Williams, Citrus Heights, CA (US); James M Dodd, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 925 days.

(21) Appl. No.: 09/821,421

(22) Filed: Mar. 29, 2001

(65) Prior Publication Data

US 2002/0144071 A1 Oct. 3, 2002

(51) Int. Cl.⁷ .............................................. G06F 12/06
(52) U.S. Cl. ...................... 711/167; 711/158; 711/151; 710/40; 710/36
(58) Field of Search ................................ 711/100–200; 710/36, 40

(56) References Cited

U.S. PATENT DOCUMENTS

| | | | | |
|---|---|---|---|---|
| 5,826,109 A | * | 10/1998 | Abramson et al. | 711/151 |
| 6,154,821 A | * | 11/2000 | Barth et al. | 711/170 |
| 6,185,644 B1 | | 2/2001 | Farmwald et al. | |
| 6,415,369 B1 | * | 7/2002 | Chodnekar et al. | 711/158 |
| 6,578,117 B2 | * | 6/2003 | Weber | 711/151 |
| 6,587,894 B1 | * | 7/2003 | Stracovsky et al. | 710/6 |

OTHER PUBLICATIONS

Hardware Fault Containment in Scalable Shared–Memory Multiprocessors, D. Teodosiu et al., Computer Systems Laboratory, Stanford University (12 p.), 1977.*
Johnson, Mike, "Superscalar Microprocessor Desighn", Englewood Cliffs, N.J.,: Prentice–hall, 1991, pp. vii–xi.*
Rixner, Scott, Et Al., Memory Access Scheduling, To appear in ISCA–27 (2000), Computer Systems Laboratory, Stanford University, Stanford, CA 94305, pp. 1–11.*
Direct Rambus (Technology Disclosure), "1.6 GM/memory sec", Oct. 1997, pp. 1–46.*

* cited by examiner

*Primary Examiner*—Pierre-Michel Bataille
(74) *Attorney, Agent, or Firm*—Pillsbury Winthrop Shaw Pittman LLP

(57) ABSTRACT

A method of handling memory read return data from different time domains includes determining a number of distinct memory device ranks. A time domain for each of the distinct memory device ranks is determined. A transaction is scheduled based on the time domain for each of the distinct memory device ranks so that at least one of data collisions and out-of-order data returns are prevented.

20 Claims, 6 Drawing Sheets

| Read Cmd to Rank C | | Read Cmd to Rank A | 1st Read Cmd at C<br>2nd Read Cmd at A | | 1st Read Data from C<br>2nd Read Data from A | 2nd Read Data from A Received at Controller | | 1st Read Data from C Received at Controller | |
|---|---|---|---|---|---|---|---|---|---|
| CLOCK 1 | CLOCK 2 | CLOCK 3 | CLOCK 4 | CLOCK 5 | CLOCK 6 | CLOCK 7 | CLOCK 8 | CLOCK 9 | CLOCK 10 |
| 201 | 202 | 203 | 204 | 205 | 206 | 207 | 208 | 209 | 210 |

FIG. 2

METHOD AND APPARATUS FOR HANDLING MEMORY READ RETURN DATA FROM DIFFERENT TIME DOMAINS

BACKGROUND OF THE INVENTION

1. Field of the Invention

The present invention generally relates to memory systems. More particularly, the present invention relates to memory controllers adapted to handle memory read return data from different time domains of memory devices.

2. Discussion of the Related Art

Current and future dynamic random access memory (DRAM)-based memory subsystems employ high-speed interfaces, commonly referred to as a channel, to transmit data (both address/commands and data to be written to the DRAM) and to receive data being read. As the frequency of these interfaces to the memory subsystem increase, the number of clock periods required to traverse the physical implementation of the memory subsystem's communication channel becomes greater than one. This configuration means that multiple time domains exist in the communication channel.

In other words, a memory controller may be connected via the communication channel to, for example, a plurality of DRAM ranks, each being a different physical distance away from the memory controller. A DRAM rank is defined as all of the DRAM devices connected to the same select signal. Because of the different distances for each DRAM rank connected to the communication channel, the time for an issued command to be received by a DRAM rank is different for each DRAM rank connected to the communication channel, as the DRAM ranks closer to the memory controller would receive the command earlier than those positioned further away. That is, the command signal takes more time to travel down the communication channel to the DRAM ranks located further away from the memory controller than those located closer.

DRAM ranks may be connected to the communication channel at a different location. Therefore, each DRAM rank may have a different time domain. For example, it may take one clock cycle for DRAM rank A to receive a command from the memory controller, two clock cycles for DRAM rank B to receive a command from the memory controller, and three clock cycles for DRAM rank C to receive a command from the memory controller. In this example configuration, DRAM rank B is twice as far from the memory controller as DRAM rank A, and DRAM rank C is three times further from the memory controller as DRAM rank A.

If multiple time domains existing in the communication channel are not accounted for, it is possible that read commands issued from the memory controller, for example, may result in memory read return data to be transmitted to the memory controller "out-of-order" from the order the read commands were originally issued. That is, a read command subsequently issued to a DRAM rank closer to the memory controller than one previously issued to a DRAM rank located further away may result in the memory read return data from the closer DRAM rank arriving at the memory controller before the memory read return data from the further DRAM rank.

Moreover, even though read commands may be issued sequentially from the memory controller to the different DRAM ranks located at different locations from each other, memory read return data may be transmitted from different DRAM ranks back to the memory controller so that they arrive at the same time, thereby causing a "data collision". Memory controllers are typically not adapted to handle receipt of out-of-order memory read return data. Data collisions cause corruption of the data, making the received "collided" data unusable.

Adding pipeline stages to a DRAM device's data return path is one way to "levelize" the channel by building "delay" into the DRAM devices so as to minimize the effects of multiple time domains existing in the communication channel. That is, "levelization" is a process by which pipeline delay is added to DRAM devices closer in position to the memory controller so as to make all data returns take the same amount of time, regardless of their distances from the memory controller. However, adding pipeline stages increases the complexity of the DRAM device, not to mention increasing their costs of production. Moreover, because levelization prevents out-of-order data returns from occurring, out-of-order handling features found in some memory controllers, which allow an increase in data bus efficiency and a reduction in latency, would be wasted.

BRIEF DESCRIPTION OF THE DRAWINGS

FIG. 2 illustrates a sample operation of a memory system as illustrated in FIG. 1 where read return data is received out-of-order by a memory controller;

DETAILED DESCRIPTION

Figure 1:
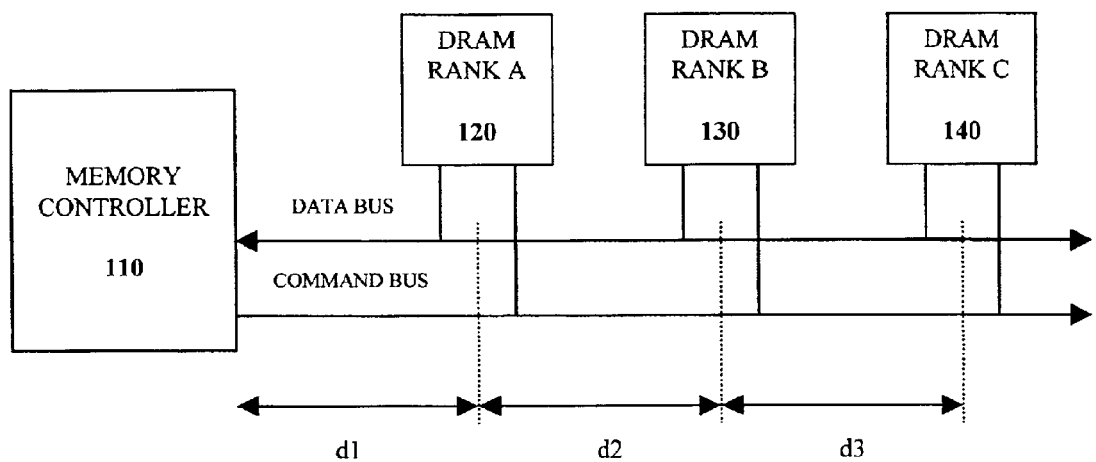
FIG. 1 illustrates a memory system according to an embodiment of the present invention.

FIG. 1 illustrates a memory system according to an embodiment of the present invention. A memory controller 110 has a connection (via a data bus and a command bus) to DRAM rank A 120, DRAM rank B 130, and DRAM rank C 140. As mentioned above, a "rank" is defined as all the memory (DRAM) devices connected to the same select signal, which may include just a single memory (DRAM) device or subsystem. In the memory system of FIG. 1, each of the three DRAM ranks 120, 130, 140 may be selected individually. The command bus transmits access requests to the DRAMs, and the data bus transmits to and receives data from the DRAMs.

Each of the three DRAM ranks 120, 130, 140 are located at a particular distance away from the memory controller 110. DRAM rank A 120 is located distance "d1" away from the memory controller 110, DRAM rank B 130 is located distance "d1+d2" away from the memory controller 110, and DRAM rank C 140 is located distance "d1+d2+d3" away from the memory controller 110. For example, each of the distances d1, d2, and d3 may be equal to distance D. For discussion, it is assumed that the clock period is X nanoseconds (ns), and that the time it takes for signals to propagate through a distance D is X ns (one clock period). In other words, it would take command data issued from the memory controller 110 X ns to arrive at DRAM rank A 120, 2X ns to arrive at DRAM rank B 130, and 3X ns to arrive at DRAM rank C 140. Accordingly, it would take X ns for read return data to travel to the memory controller 110 from DRAM rank A 120, 2X ns from DRAM rank B 130, and 3X ns from DRAM rank C 140. Therefore, three distinct time domains exist in the memory system illustrated in the example of FIG. 1. The first time domain is two clock periods roundtrip, the second time domain is four clock periods roundtrip, and the third time domain is six clock periods roundtrip.

Memory controllers 110 utilized in a memory system having multiple time domains may encounter problems when a read command is issued first to a DRAM rank that is further down the communication channel (e.g., DRAM rank C 140) and then a second read command is issued to a DRAM rank that is closer (e.g., DRAM rank A 120 or DRAM rank B 130). One problem that may occur depending on when the memory controller 110 issues the read command is that the read return data may be received out-of-order as compared to the read command issuance order. Another potential problem is that a collision between read return data from a further away DRAM rank and a closer DRAM rank may occur somewhere in the communication channel. The time it takes the DRAM to decode a read command and begin transmitting the read return data also affects the timing of the receipt of read return data at the memory controller 110.

FIG. 2 illustrates a sample operation of a memory system as illustrated in FIG. 1 where read return data is received out-of-order by a memory controller. In the example illustrated in FIG. 2, it is assumed that the distances d1, d2, and d3 are all equal to distance D, one clock period is required to propagate a signal a distance D, and two clock periods are utilized by the DRAM to decode a read command and begin transmitting the read return data. Additionally, the data is received by the memory controller 110 over two clock periods. At clock one 201, a first read command is issued by the memory controller 110 to DRAM rank C (see FIG. 1). Subsequently, at clock three 203, a second read command is issued by the memory controller 110 to DRAM rank A (see FIG. 1). Because DRAM rank C is 3D distance away from the memory controller 110, three clock periods are required for a signal to travel such a distance, and because DRAM rank A is D distance away from the memory controller 110, one clock period is required for a signal to travel such a distance. Accordingly, the first read command and the second read command both arrive at DRAM rank C and DRAM rank A, respectively, at clock four 204.

Because two clock periods are utilized by the DRAM to decode a read command and begin transmitting the read return data, the first read data being transmitted from DRAM rank C 140 and the second read data being transmitted from DRAM rank A 120 occur at clock six 206. One clock period lapses before the second read data being transmitted from DRAM rank A 120 arrives at the memory controller 110 at clock seven 207. The second read data is completely received by the memory controller 110 at clock eight 208. Three clock periods lapse before the first read data being transmitted from DRAM rank C 140 arrives at the memory controller 110 at clock nine 209. The first read data is completely received by the memory controller 110 at clock ten 210.

Therefore, in the example illustrated in FIG. 2, a problem exists in that the data received by the memory controller 110 is not in the order in which the memory controller 110 issued the commands. That is, the second read data was received by the memory controller 110 before the first read data, even though the read command for the first read data was issued first before the read command for the second read data. Additionally, another problem may occur in a memory system having multiple time domains where the read return data arrive from different DRAM ranks at the memory controller 110 at the same time, thereby overlapping on the communication channel, which causes data corruption.

Accordingly, a memory controller 110 may be adapted to handle memory read return data from different time domains to prevent at least one of data collisions and out-of-order data returns. The memory controller 110 preferably includes circuitry and instructions to determine the number of distinct memory device (e.g., DRAM) ranks connected to a communication channel (e.g., data bus and command bus) with the memory controller 110, and to determine a time domain for each of the distinct memory device ranks. Once the time domain for each of the distinct memory device ranks have been determined, the memory controller 110 schedules transactions based on the time domains determined for each of the distinct memory device ranks so that at least one of data collisions and out-of-order data returns do not occur. With memory controllers 110 that are adapted to handle out-of-order data returns, preventing data collisions becomes the priority.

One way of determining the number of distinct memory device ranks is to utilize a scheme known as Serial Presence Detect. Serial Presence Detect uses a serial electrically-erasable programmable read-only-memory (EEPROM) to store the presence detect information as serial data, and requires only two pins (one for enabling SPD, and one for data). The EEPROM contains data programmed by a memory module manufacturer that identifies the module type and the various memory device organization and timing parameters. However, any suitable schemes for determining the number of distinct memory device ranks may be utilized.

Figure 3:
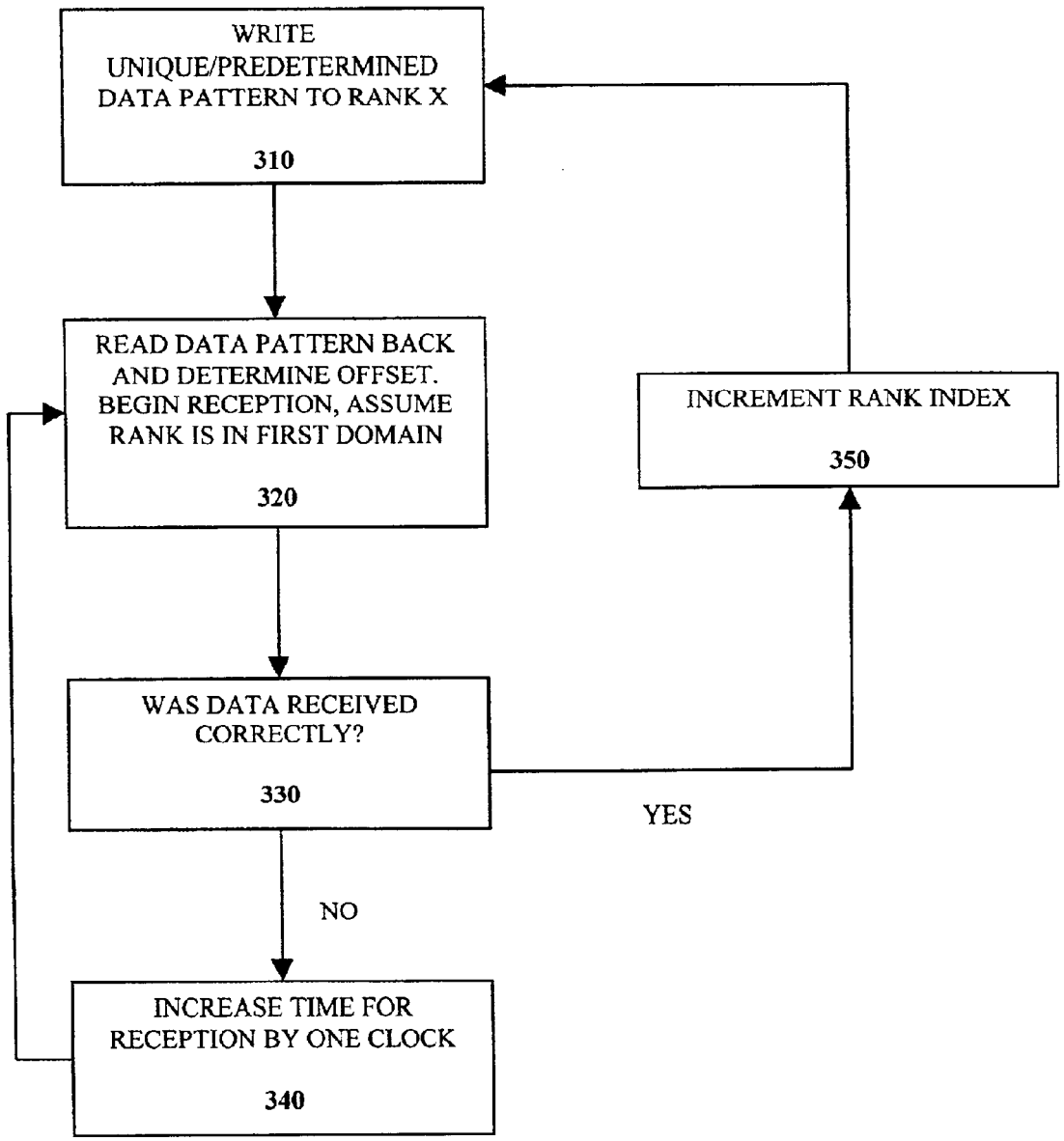
FIG. 3 illustrates a flowchart diagram for determining a time domain for each of the distinct memory device ranks according to an embodiment of the present invention.

FIG. 3 illustrates a flowchart diagram for determining a time domain for each of the distinct memory device ranks according to an embodiment of the present invention. Once the number of distinct memory device ranks have been determined, the time domains for each of the distinct memory device ranks are determined. Although the memory controller 110 may presume the relative location of each distinct memory device rank, this presumption is not required to determine the time domains for each of the distinct memory device ranks.

In order to determine the time domains for each of the distinct memory device ranks, a unique or predetermine data pattern is written 310 to a memory device rank to be tested. This data pattern is a test data pattern that the memory controller 110 recognizes as the test pattern used to determine the time domains. Once the data pattern has been written 310 onto the memory device rank to be tested, the data pattern is read back 320 by the memory controller 110. The memory controller 110 receives the data pattern, initially assuming that the time domain of the memory device rank to be tested is in a first time domain. The memory controller 110 then determines whether the data pattern was correctly received. More specifically, the memory controller 110 determines whether the data pattern was received at the clock period that corresponds to the assumed time domain (initially, the first time domain) for the memory device rank to be tested.

If the data pattern was not correctly received, the time domain (initially assumed at one) of the memory device rank to be tested is incremented 340 by one clock period. Taking into account the new time domain, steps 320 and 330 are repeated, and it is again determined 330 whether the data pattern was correctly received. The time domain of the memory device rank to be tested is incremented 340 if the data pattern was not correctly received, and steps 320 and 330 are repeated (with a successive time domain) until the data pattern is correctly received.

Once the data pattern is correctly received (determined from step 330), the time domain of the memory device rank being tested is established. A memory device rank index is incremented 350, and the time domain for another memory device rank to be tested is determined according to the above-described steps. The entire process illustrated in FIG. 3 continues until the time domains for each of the distinct memory device ranks have been determined. Although FIG. 3 illustrates a sample flowchart diagram for determining a time domain for each of the distinct memory device ranks according to an embodiment of the present invention, any suitable method may be utilized, such as determining the time domains using known relative distances between the memory device ranks.

Figure 4:
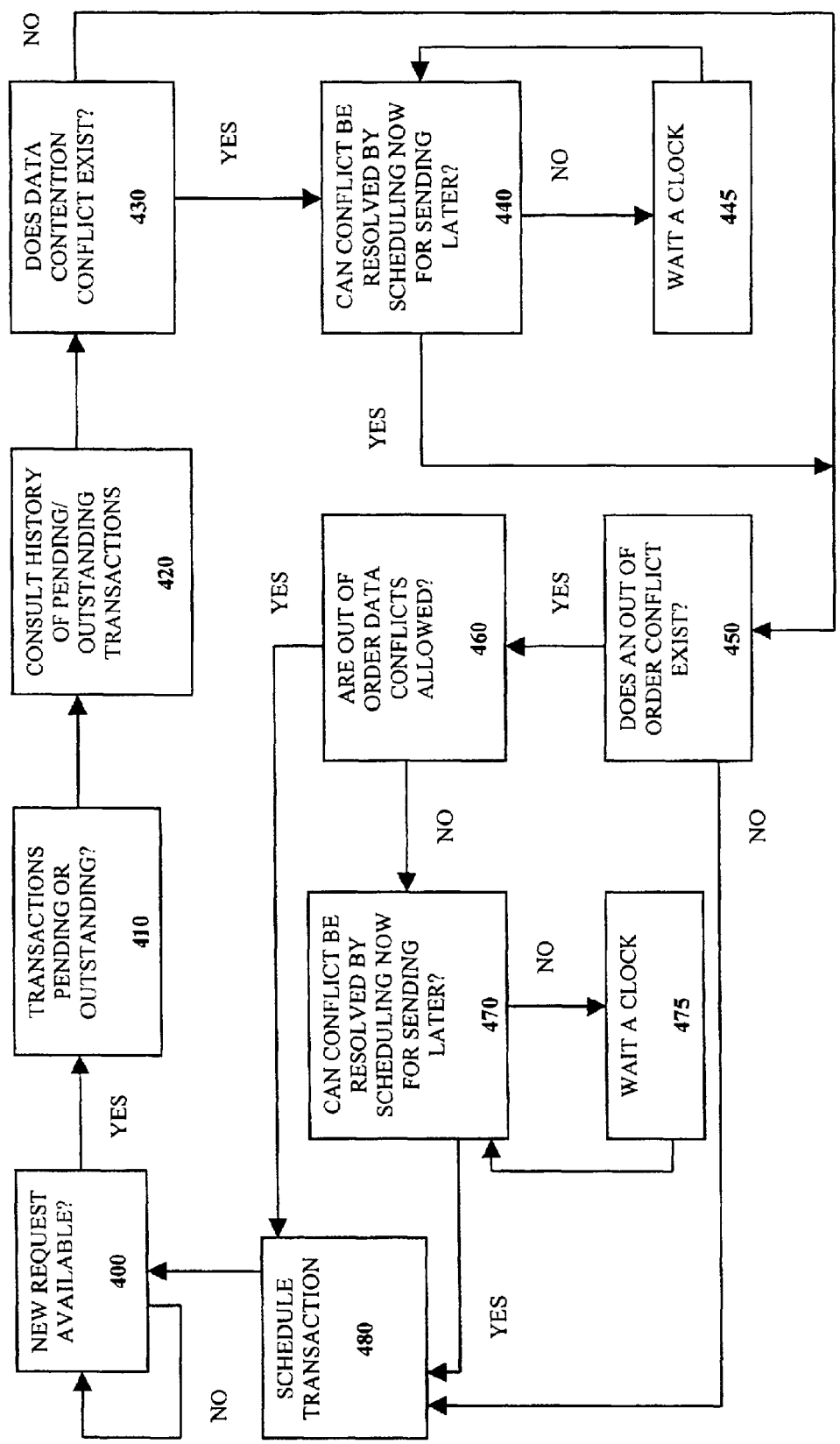
FIG. 4 illustrates a flowchart diagram for scheduling a transaction based on the time domain determined for each of the distinct memory device ranks according to an embodiment of the present invention.

FIG. 4 illustrates a flowchart diagram for scheduling a transaction based on the time domain determined for each of the distinct memory device ranks according to an embodiment of the present invention. Once time domain information is associated with each DRAM rank 120, 130, 140, normal operation of the memory system may occur. The memory controller 110 includes circuitry and instructions to handle the scheduling of transactions taking into account the existence of multiple time domains of the memory device ranks 120, 130, 140.

The memory controller 110 determines 400 whether a new request for a transaction (e.g., a read command/data request) is available. If there is a new request, the memory controller 110 determines 410 whether there are pending or outstanding transactions and consults 420 the history of pending or outstanding transactions. In this manner, the memory controller 110 is aware of all of the pending or outstanding transactions so as to be able to schedule subsequent transactions to avoid data collisions and/or out-of-order data returns with the pending or outstanding transactions.

Once the memory controller is aware of all of the pending or outstanding transactions, the memory controller 110 determines 430 whether a data contention (collision) conflict would exist for the new request for a transaction. The determination 430 is made by analyzing the history of pending or outstanding transactions to determine which clocks are already occupied by the pending or outstanding transactions, and whether a clock is available to handle the new transaction. Based on the pending or outstanding transactions, if it is shown that a data contention conflict would exist, the memory controller 110 determines 440 whether the data contention conflict would be resolved by scheduling the transaction now, and sending the transaction later. If the data contention conflict would not be resolved by scheduling the transaction now and sending the transaction later, the memory controller 110 waits one clock 445 before again determining 440 whether the data contention conflict would be resolved by scheduling the transaction now and sending the transaction later. Steps 440 and 445 are repeated until it is determined that the data contention conflict would be resolved by scheduling the transaction now and sending the transaction later.

Once it is determined (from step 440) that the data contention conflict may be resolved by scheduling the transaction now and sending the transaction later, or that no data contention conflict exists (from step 430), the memory controller 110 determines 450 whether an out-of-order data conflict would exist. If an out-of-order data conflict would not exist, then the memory controller 110 schedules 480 the transaction. However, if an out-of-order data conflict would exist, then the memory controller 110 determines 460 whether out-of-order data conflicts are allowed. If out-of-order data conflicts are allowed, then the memory controller 110 schedules 480 the transaction.

If out-of-order data conflicts are not permitted, particularly because the memory controller 110 is not adapted to handle out-of-order data returns, the memory controller 110 determines 470 whether the out-of-order data conflict would be resolved by scheduling the transaction now and sending the transaction later. If the out-of-order data conflict would be resolved by scheduling the transaction now and sending the transaction later, the memory controller 110 schedules 480 the transaction. If the out-of-order data conflict would not be resolved by scheduling the transaction now and sending the transaction later, the memory controller 110 waits one clock 475 before determining 470 again whether the out-of-order data conflict would be resolved by scheduling the transaction now and sending the transaction later. Steps 470 and 475 are repeated until it is determined that the out-of-order data conflict would be resolved by scheduling the transaction how and sending the transaction later. During scheduling 480 of the transaction, the memory controller 110 also takes into account whether the pending transaction (e.g., command) queue is saturated, and whether available transaction slots in the queue would meet the timing requirements needed to prevent a data contention conflict and/or an out-of-order data conflict.

Figure 5:
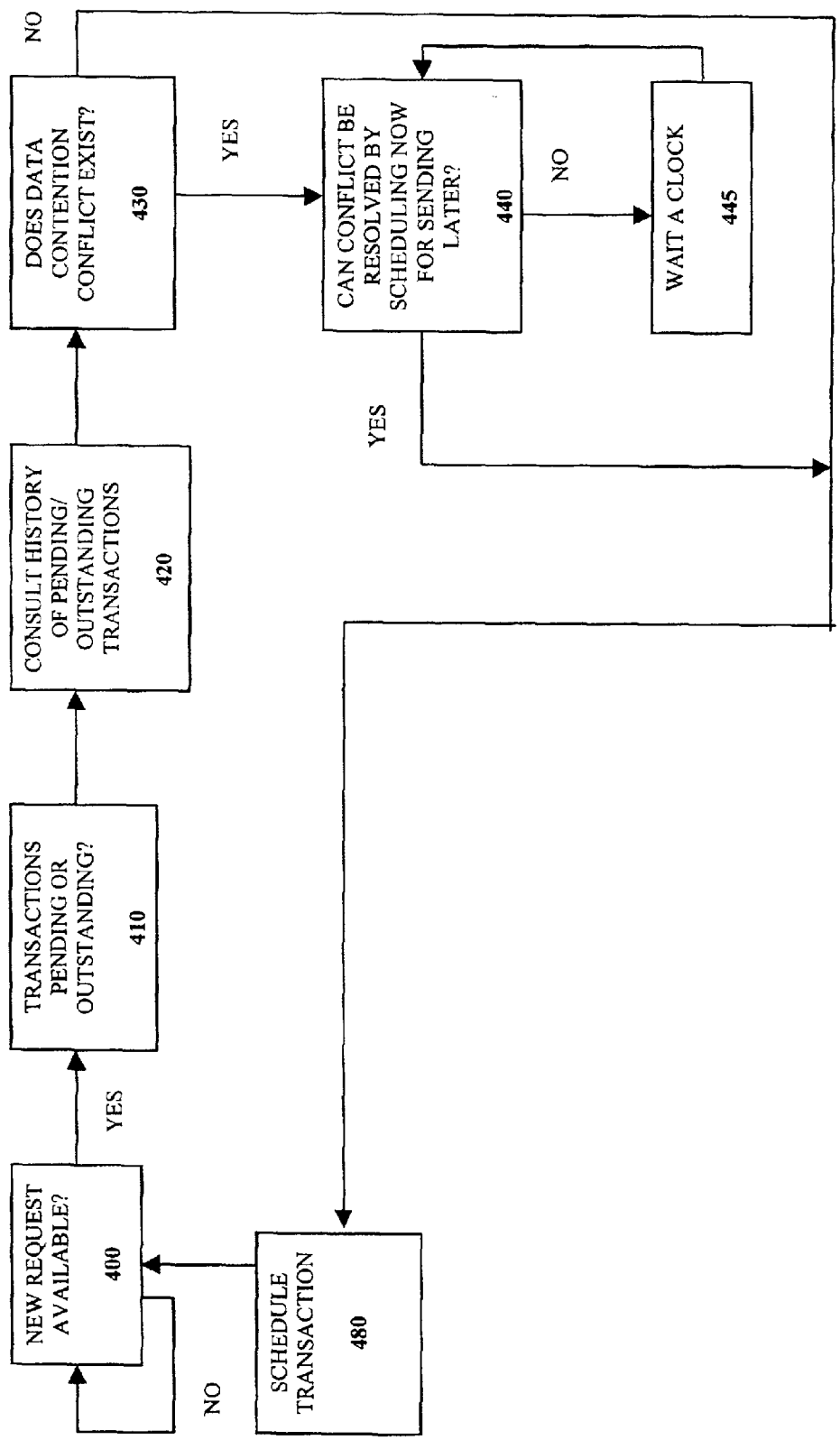
FIG. 5 illustrates a flow chart diagram for scheduling a transaction when out-of-order data conflicts are permitted based on the time domain determined for each of the distinct memory device ranks according to an embodiment of the present invention.

FIG. 5 illustrates a flow chart diagram for scheduling a transaction when out-of-order data conflicts are permitted based on the time domain determined for each of the distinct memory device ranks according to an embodiment of the present invention. Because it is usually known ahead of time whether a memory controller 110 is adapted to handle out-of-order data conflicts, for a memory controller 110 known to have such a feature, circuitry and instructions to determine 460 whether data conflicts are allowed (see FIG. 4) are not required to be included. Therefore, for a memory controller 110 having out-of-order data return handling capabilities, once it is determined (from step 440) that the data contention conflict may be resolved by scheduling the transaction now and sending the transaction later, or that no data contention conflict exists (from step 430), the memory controller 110 schedules 480 the transaction.

Figure 6:
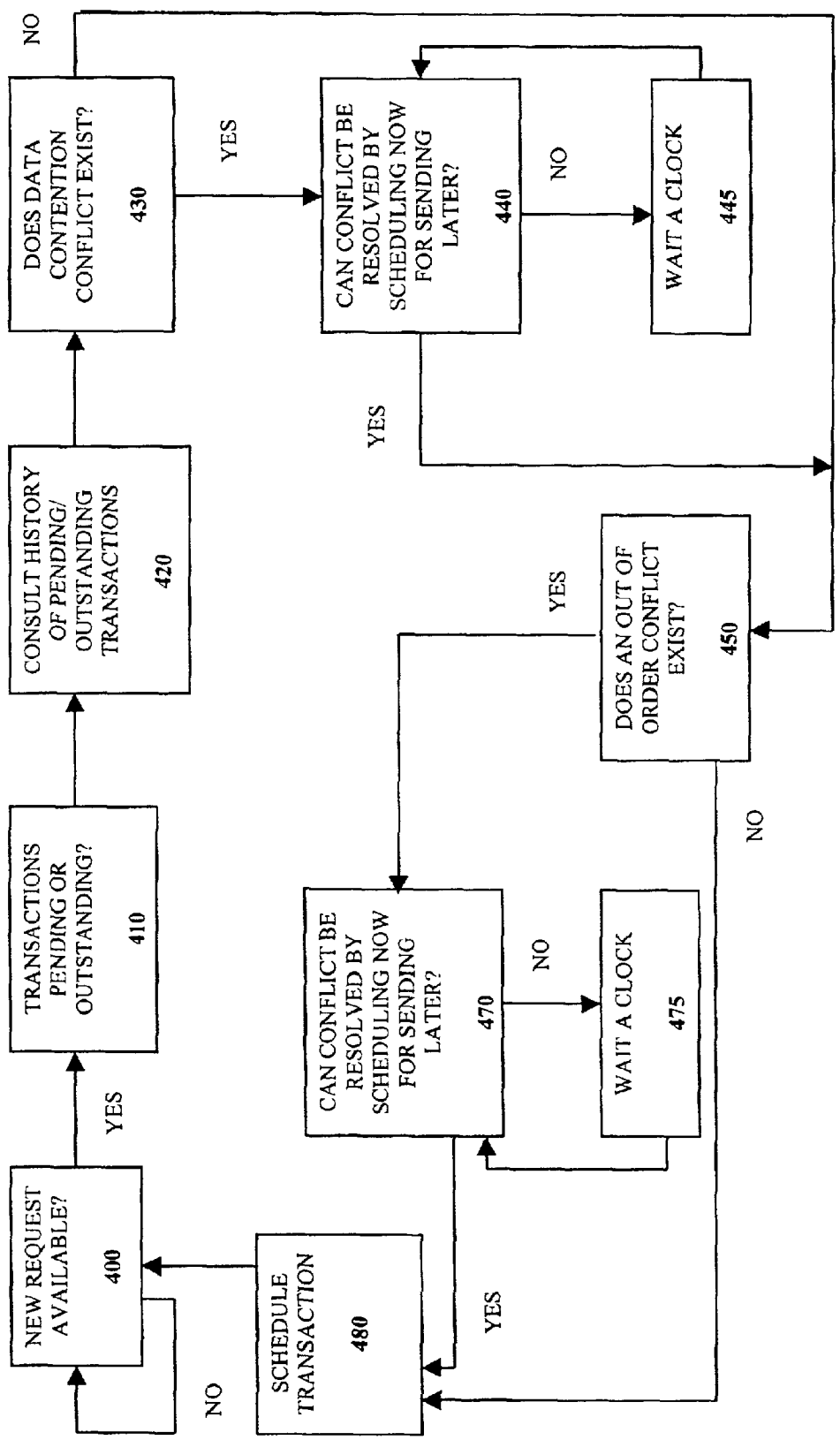
FIG. 6 illustrates a flow chart diagram for scheduling a transaction when out-of-order data conflicts are not permitted based on the time domain determined for each of the distinct memory device ranks according to an embodiment of the present invention.

FIG. 6 illustrates a flow chart diagram for scheduling a transaction when out-of-order data conflicts are not permitted based on the time domain determined for each of the distinct memory device ranks according to an embodiment of the present invention. For a memory controller 110 known to not be adapted to handle out-of-order data returns, circuitry and instructions to determine 460 whether data conflicts are allowed (see FIG. 4) are not required to be included. Instead, upon determination 450 of whether an out-of-order conflict would exist, the memory controller 110 schedules 480 the transaction if it is determined that an out-of-order conflict would not exist. And, if it is determined that an out-of-order conflict would exist, the memory controller 110 determines 470 whether the out-of-order data conflict would be resolved by scheduling the transaction now and sending the transaction later. If the out-of-order data conflict would be resolved by scheduling the transaction now and sending the transaction later, the memory controller 110 schedules 480 the transaction. If the out-of-order data conflict would not be resolved by scheduling the transaction now and sending the transaction later, the memory controller 110 waits one clock 475 before determining 470 again whether the out-of-order data conflict would be resolved by scheduling the transaction now and sending the transaction later. Steps 470 and 475 are repeated until it is determined that the out-of-order data conflict would be resolved by scheduling the transaction now and sending the transaction later.

The memory system of the present invention reduces the complexity and costs of a typical DRAM device utilizing "levelization", thereby improving the performance of DRAM devices. Moreover, the memory system according to an embodiment of the present invention provides the flexibility of allowing out-of-order data returns to occur so that memory controllers having out-of-order handling features may be optimized for their use, thus reducing latency and increasing the data bus efficiency.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method of handling memory read return data from different time domains, comprising:

determining a number of distinct memory device ranks;

determining a time domain for each of the distinct memory device ranks; and scheduling a transaction based on the time domain for each of the distinct memory device ranks so that at least one of data collisions and out-of-order data returns are prevented, wherein the scheduling of the transaction includes:

determining whether a new request is available;

determining whether there are pending or outstanding transactions if the new request is available;

consulting a history of pending or outstanding transactions;

determining whether a data contention conflict exists;

determining whether the data contention conflict may be resolved by scheduling the transaction now and sending the transaction later if the data contention conflict exists;

waiting at least a clock if the data contention conflict cannot be resolved by scheduling the transaction now and sending the transaction later;

determining whether an out-of-order data conflict exists if the data contention conflict does not exist, and scheduling the transaction if the out-of-order data conflict does not exist; and determining if the out-of-order data conflict exists if the data contention conflict can be resolved by scheduling the transaction now and sending the transaction later, and scheduling the transaction if the out-of-order data conflict does not exist.

2. The method according to claim 1, further including determining a relative position of each of the distinct memory device ranks.

3. The method according to claim 1, wherein the determining of the number of the distinct memory device ranks is performed utilizing Serial Presence Detect (SPD).

4. The method according to claim 1, wherein the determining of the time domain for each of the distinct memory device ranks includes:

writing a predetermined data pattern to a memory device rank to be tested;

reading back the predetermined data pattern;

receiving the predetermined data pattern, assuming that the time domain of the memory device rank to be tested is in a first time domain;

determining whether the predetermined data pattern was correctly received;

increasing the time domain of the memory device rank to be tested by at least a clock if the predetermined data pattern was not correctly received; and establishing the time domain for the memory device rank to be tested once the predetermined data pattern is correctly received.

5. The method according to claim 1, further including:

determining whether out-of-order data conflicts are allowed if the out-of-order data conflict exists, and scheduling the transaction if out-of-order data conflicts are allowed;

determining whether the out-of-order data conflict may be resolved by scheduling the transaction now and sending the transaction later if out-of-order data conflicts are not allowed;

waiting at least a second clock if the out-of-order data conflict cannot be resolved by scheduling the transaction now and sending the transaction later; and scheduling the transaction if the out-of-order data conflict may be resolved by scheduling the transaction now and sending the transaction later.

6. The method according to claim 1, wherein the scheduling of the transaction includes:

scheduling the transaction if the data contention conflict may be resolved by scheduling the transaction now and sending the transaction later; and scheduling the transaction if the data contention conflict does not exist.

7. A memory system, comprising:

a plurality of distinct memory device ranks;

a memory controller having a connection with the plurality of the distinct memory device ranks, wherein the memory controller is adapted to determine a number of the distinct memo device ranks to determine a time domain for each of the distinct memory device ranks, and to schedule a transaction based on the time domain for each of the distinct memory device ranks so that at least one of data collisions and out-of-order data returns are prevented, wherein the memory controller, in order to schedule the transaction, is adapted to determine whether a new request is available, to determine whether there are pending or outstanding transactions if the new request is available, to consult a history of pending or outstanding transactions, to determine whether a data contention conflict exists, to determine whether the data contention conflict may be resolved by scheduling the transaction now and sending the transaction later if the data contention conflict exists, waiting at least a clock if the data contention conflict cannot be resolved by scheduling the transaction now and sending the transaction later, to determine if an out-of-order data conflict exists if the data contention conflict does not exist and schedule the transaction if the out-of-order data conflict does not exist, and to determine if the out-of-order data conflict exists if the data contention conflict can be resolved by scheduling the transaction now and sending the transaction later and schedule the transaction if the out-of-order data conflict does not exist.

8. The memory system according to claim 7, wherein the memory controller is further adapted to determine a relative position of each of the distinct memory device ranks.

9. The memory system according to claim 7, wherein the memory controller utilizes Serial Presence Detect (SPD) to determine the number of the distinct memory device ranks.

10. The memory system according to claim 7, wherein the memory controller, in order to determine the time domain for each of the distinct memory device ranks, is adapted to write a predetermined data pattern to a memory device rank to be tested, to read back the predetermined data pattern, to receive the predetermined data pattern assuming that the time domain of the memory device rank to be tested is in a first time domain, to determine whether the predetermined data pattern was correctly received, to increase the time domain of the memory device rank to be tested by at least a clock if the predetermined data pattern was not correctly received, and to establish the time domain for the memory device rank to be tested once the predetermined data pattern is correctly received.

11. The memory system according to claim 7, wherein the memory controller, in order to schedule the transaction, is further adapted to determine whether out-of-order data conflicts are allowed if the out-of-order data conflict exists and schedule the transaction if out-of-order data conflicts are allowed, to determine whether the out-of-order data conflict may be resolved by scheduling the transaction now and sending the transaction later if out-of-order data conflicts are not allowed, to wait at least a second clock if the out-of-order data conflict cannot be resolved by scheduling the transaction now and sending the transaction later, and to schedule the transaction if the out-of-order data conflict may be resolved by scheduling the transaction now and sending the transaction later.

12. The memory system according to claim 7, wherein the memory controller, in order to schedule the transaction, is adapted to schedule the transaction if the data contention conflict may be resolved by scheduling the transaction now and sending the transaction later, and to schedule the transaction if the data contention conflict does not exist.

13. The memory system according to claim 7, wherein the connection is a bus.

14. The memory system according to claim 13, wherein the bus includes a data bus and an address/command bus.

15. A memory controller, comprising;
a machine-readable medium; and
machine-readable program code, stored on the machine-readable medium, having instructions to,
determine a number of distinct memory device ranks,
determine a time domain for each of the distinct memory device ranks, and
schedule a transaction based on the time domain for each of the distinct memory device ranks so that at least one of data collisions and out-of-order data returns are prevented, wherein the machine-readable program code, to schedule the transaction, includes instructions to:

determine whether a new request is available;

determine whether there are pending or outstanding transactions if the new request is available;

consult a history of pending or outstanding transactions;

determine whether a data contention conflict exists;

determine whether the data contention conflict may be resolved by scheduling the transaction now and sending the transaction later if the data contention conflict exists;

wait at least a clock if the data contention conflict cannot be resolved by scheduling the transaction now and sending the transaction later;

determine if an out-of-order data conflict exists if the data contention conflict does not exist, and scheduling the transaction if the out-of-order data conflict does not exist; and determine whether the out-of-order data conflict exists if the data contention conflict can be resolved by scheduling the transaction now and sending the transaction later, and scheduling the transaction if the out-of-order data conflict does not exist.

16. The memory controller according to claim 15, wherein the machine-readable program code includes instructions to determine a relative position of each of the distinct memory device ranks.

17. The memory controller according to claim 15, wherein the memory controller utilizes Serial Presence Detect (SPD) to determine the number of the distinct memory device ranks.

18. The memory controller according to claim 15, wherein the machine-readable program code, to determine the time domain for each of the distinct memory device ranks, includes instructions to:

write a predetermined data pattern to a memory device rank to be tested;

read back the predetermined data pattern;

receive the predetermined data pattern, assuming that the time domain of the memory device rank to be tested is in a first time domain;

determine whether the predetermined data pattern was correctly received;

increase the time domain of the memory device rank to be tested by at least a clock if the predetermined data pattern was not correctly received; and establish the time domain for the memory device rank to be tested once the predetermined data pattern is correctly received.

19. The memory controller according to claim 15, wherein the machine-readable program code, to schedule the transaction, further includes instructions to:

determine whether out-of-order data conflicts are allowed if the out-of-order data conflict exists, and scheduling the transaction if out-of-order data conflicts are allowed;

determine whether the out-of-order data conflict may be resolved by scheduling the transaction now and sending the transaction later if out-of-order data conflicts are not allowed;

wait at least a second clock if the out-of-order data conflict cannot be resolved by scheduling the transaction now and sending the transaction later; and schedule the transaction if the out-of-order data conflict may be resolved by scheduling the transaction now and sending the transaction later.

20. The memory controller according to claim 15, wherein the machine-readable program code, to schedule the transaction, includes instructions to:

schedule the transaction if the data contention conflict may be resolved by scheduling the transaction now and sending the transaction later; and schedule the transaction if the data contention conflict does not exist.

* * * * *